Dec. 8, 1970     E. V. SOMERS     3,546,499
COMBINATION PROCESS FOR ELECTRICAL POWER
GENERATION AND NITROGEN FIXATION
Filed July 6, 1965
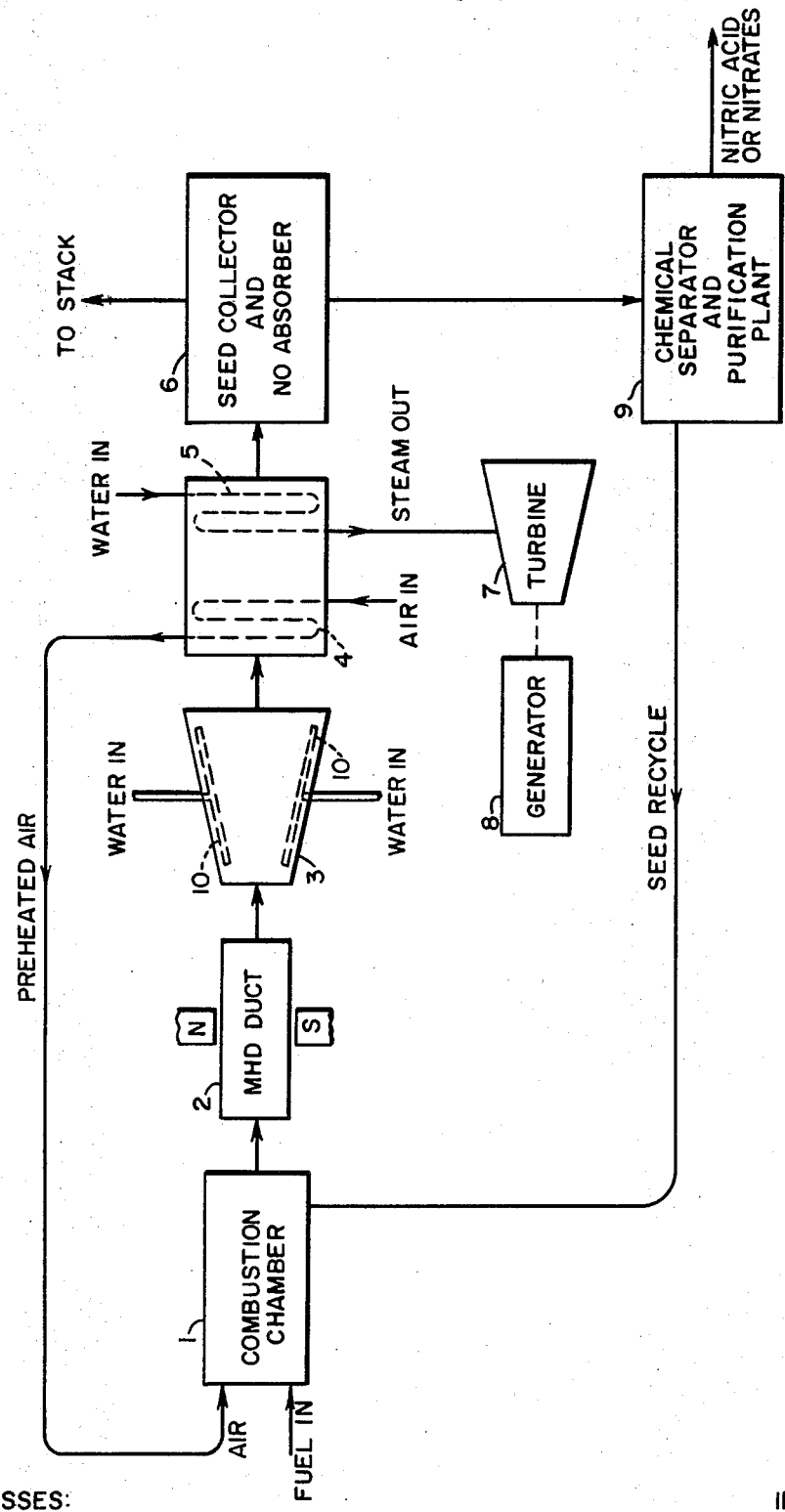
INVENTOR
Edward V. Somers
ATTORNEY

United States Patent Office 3,546,499
Patented Dec. 8, 1970

3,546,499
COMBINATION PROCESS FOR ELECTRICAL POWER GENERATION AND NITROGEN FIXATION
Edward V. Somers, Pittsburgh, Pa., assignor to Westinghouse Electric Corporation, Pittsburgh, Pa., a corporation of Pennsylvania
Filed July 6, 1965, Ser. No. 469,670
Int. Cl. H02n 4/02
U.S. Cl. 310—11                3 Claims

ABSTRACT OF THE DISCLOSURE

A method and means for generating electricity and producing and recovering nitrogen compounds by injecting a water spray into a diffusing structure receiving hot exhaust gases from an MHD generating duct, said spray being effective to rapidly quench the hot gases and thereby fix the nitrogen compounds before they have a chance to disassociate.

---

This invention relates generally to a process whereby electrical power generation and fixed nitrogen manufacture may be accomplished simultaneously, and more particularly to a means and method of efficiently fixing nitrogen compounds in the output of a magnetohydrodynamic (MHD) generator.

Large quantities of electrical energy may be efficiently generated through the use of magnetohydrodynamic (MHD) techniques. An MHD generator utilizes an electrically conducting working fluid, which may be an inert gas or a combustion product gas, which is heated to a temperature range in which it becomes thermally ionized. The high temperature range necessary for ionizing the working fluid lends itself to the reaction between oxygen and nitrogen with the use of combustion fuels and excess air. In such a temperature range, the oxygen and nitrogen combine to form nitrogen compounds which are unstable at somewhat lower temperatures unless a way is provided for rapidly bringing the compounds to a low stable temperature before the nitrogen and oxygen have a chance to dissociate.

In MHD devices fuel is burned with excess air in a combustion and equilibrium chamber in which the hot gases have a residence time of a few tenths of a second. Sufficient excess air must be used to give 5% or more oxygen in the gases after combustion. The higher the percentage of excess air the higher will be the nitrogen oxide yield. The temperatures reached must be at least 3800° F. or higher if possible. Such temperatures require efficient air preheating or enrichment of air with oxygen. After combustion, the gases pass at a high velocity through the MHD duct in which electrical energy is abstracted from the stream by interaction of the flow with a transverse magnetic field. This process results in some cooling of the gases.

Reaction kinetic data indicate that a temperature of 3200° F. and below is sufficient to stabilize (freeze) 70 to 80% of the nitric oxide (NO) formed in the combustion process. A typical MHD cycle, temperature and timewise, is as follows:

(1) MHD nozzle _____ 4400° F. inlet; 4160° F. outlet; time, $\Delta t < 1/500$ sec.
(2) MHD generator ___ 4160° F. inlet; 3460° F. outlet; time, $\Delta t < 1/50$ sec.
(3) MHD diffuser ____ 3460° F. inlet; 3720° F. outlet; time $\Delta t < 1/500$ sec.

As can be seen from the foregoing data, the temperatures remain above those necessary for effecting fixation of the nitric oxide. Further rapid cooling is necessary to quench and freeze the nitric oxide in order to realize a high percentage of NO recovery before the components have time to revert back and separate into nitrogen and oxygen.

It is therefore an object of the present invention to provide a new and improved magnetohydrodynamic generating device in which nitrogen compounds can be efficiently produced while simultaneously generating electric power.

It is a further object of this invention to provide a new and improved means and method for quenching an MHD gas stream in order to effect rapid cooling designed to stabilize nearly all of the nitrogen oxide contained in the gas stream.

A further object of this invention is to provide rapid quenching of nitrogen oxide by simple and inexpensive means.

Broadly, the present invention provides a method and means for injecting a liquid water spray into the hot exhaust gases flowing from an MHD generating duct thereby effecting the rapid quenching necessary for fixing the nitrogen compounds contained in the hot exhaust gases.

These and other objects of the invention will become more apparent when considered in view of the following specification and drawing, in which:

The single figure shows, in schematic form, an MHD generating cycle incorporating the novel features of the invention.

Referring to the figure, a combustion chamber 1 is fed by heated air from preheater unit 4 which uses the hot exhaust gases from an MHD generating device for preheating the incoming air. In combustion chamber 1, fuel (solid, liquid or gas) is burned with excess air to give 5% or more oxygen in gases after combustion. Nitric oxide is produced from the air supplied to chamber 1 as a result of the high temperatures in chamber 1. The hot gases flow at a high velocity into MHD duct 2 after alkali metal seed is added for purposes of increasing the ionization of the gases. The conducting gases generate an electrical current in duct 2 as they rapidly flow through a transverse magnetic field in the duct produced by magnets located externally of the duct and depicted as north and south poles for simplicity of illustration. In this process, the gas is rapidly cooled at a rate of about 30,000° F. per second to a temperature that is still above that necessary for fixing a large percentage of the nitric oxide contained in the gas stream.

As mentioned previously, a temperature of 3200° F. and below is necessary for fixing or freezing the nitric oxide, and this fixing must be accomplished as rapidly as possible or the nitrogen and oxygen contained in the hot gases will dissociate and be lost to recovery. To fix and recover nearly all of the nitric oxide, a liquid water spray means 10 is disposed in a means 3 defining a path between the electrical energy generating duct 2 and heat exchange means 4 and 5. Means 3 may be a cylindrical duct, diffuser or other suitable means designed to receive and pass the hot gaseous mixtures to heat exchange means 4 and 5 exhausting from duct means 2. Duct or diffuser means 3 is further designed to receive water spray means 10. Water spray means 10 directs a water spray into the hot gaseous stream flowing through means 3 in such a quantity and under such pressure that effects evaporation of the water in about ten feet. Such a water spray and evaporation effects a very rapid cooling of the hot gases to a temperature of about 3200° F. and below without substantially affecting adversely the thermal efficiency of the MHD system.

The water spray means lends itself to the diffusion process which ordinarily is used to convert the kinetic energy (velocity) of a gas flow to pressure energy. With the rise in pressure energy there is a consequent rise in temperature. The water spray of this invention counteracts the rise in temperature with a consequent minimization of pressure rise, thus maintaining overall pressure and flow velocity within the diffuser at substantially constant values. In the same manner the overall thermal efficiency of the MHD power plant is not substantially adversely affected.

Water spray means 10 shown in the drawing is given by way of illustration only. Other suitable spray means located in any suitable place within exhaust means or diffuser 3 may be used. For example, an annular manifold structure with spaced spray nozzles located around the inside wall of a diffuser may be used. Similarly, the type and design of duct means 3 is limited only by those limitations required by MHD generating devices.

The usual elements of an MHD power generating device inherently provide the necessary means for recovering the fixed nitrogen compounds. A seed recovery unit and a purification plant are used in conventional seed recycling processes. Such means are representatively shown in the drawing and designated by numerals 6 and 9 respectively. The fixed nitrogen compounds can be readily collected in the seed collector means and together the seed and nitrogen compounds are directed to a chemical separator and depicted as part of the purification plant 9 in the drawing. The recovery means 6 is conventional; it may be a scrubber, an electrostatic precipitator or other suitable means. Similarly, the chemical separator and purifier involve well known chemical processes for effecting separation of the nitrogen compounds from seed elements.

The gases leaving means 3 are still quite hot and capable of further utilization. Therefore, before the gases are collected for recovery and delivery, they are directed through the preheater 4 and boiler heat exchanger units 5 where the steam produced in unit 5 is used to produce electricity by conventional turboelectric generators enumerated by numerals 7 and 8. As previously mentioned, the air for combustion chamber 1 is first preheated in unit 4 by the same hot gases.

The invention disclosed provides a novel means and method for effecting nitric oxide fixation while simultaneously producing electric energy by conventional means (turboelectric generation) and by magnetohydrodynamic means. By rapidly cooling the hot gases flowing in an MHD exhaust, almost 100% of the NO contained therein is quenched and made available for recovery. This efficient fixation of nitric oxide has been accomplished by simple and inexpensive means without substantial alteration of the MHD power plant arrangement.

Through the present invention has been described with a degree of particularity, it should be understood that the present disclosure is made by way of example only. Changes in detail may be made by those skilled in the art. For example, duct means 3 is shown as a separate unit for purposes of illustration only. Means 3 may be made an integral part of the exhaust end of MHD duct means 2 without departing from the spirit and scope of the invention.

I claim as my invention:

1. A method for generating electrical energy and producing nitrogen compounds, said method comprising:
    burning a fuel material with excess air in a combustion chamber to produce a heated gaseous mixture including nitrogen compounds,
    directing said heated gaseous mixture through the magnetic field of an MHD generator to generate electrical energy,
    directing the gaseous mixture from the generator to a diffusing structure,
    diffusing the gaseous mixture in said diffusing structure,
    simultaneously spraying a cooling fluid into said diffusing structure to rapidly cool the mixture to a temperature at which the nitrogen compounds are stable, and
    separating the nitrogen compounds from the gaseous mixture.

2. An electrical power generating and nitrogen compound producing means comprising:
    means for burning a fuel material with excess air to produce a heated gaseous mixture including nitrogen compounds,
    MHD apparatus having a magnetic field,
    means for passing the gaseous mixture through the magnetic field,
    means defining a diffusing path for passing the gaseous mixture from the magnetic field to heat exchange means,
    means disposed adjacent said diffusing path for spraying a cooling fluid into the gaseous mixture for rapidly cooling the gaseous mixture to a temperature at which the nitrogen compounds are stable, and
    means for separating the nitrogen compounds from the gaseous mixture and for collecting the nitrogen compounds.

3. The subject matter of claim 1 wherein:
    said burning of a fuel material is with excess air sufficient to provide at least 5% excess oxygen;
    said nitrogen compounds produced in said burning include nitric oxide;
    said temperature to which said gaseous mixture is rapidly cooled is at least as low as 3200° F.; and
    said spraying of cooling fluid counteracts the temperature rise otherwise occurring in said diffusing and maintains pressure and flow velocity across said diffusing structure at substantially constant values.

References Cited

UNITED STATES PATENTS

| | | | |
|---|---|---|---|
| 814,917 | 3/1906 | Pauling | 23—163 |
| 1,443,091 | 1/1923 | Petersen | 310—11X |
| 3,303,364 | 2/1967 | Hals | 310—11 |
| 3,471,723 | 10/1969 | Maslan | 310—11 |

DAVID X. SLINEY, Primary Examiner

U.S. Cl. X.R.

23—162